United States Patent [19]

Lamnabhi et al.

[11] Patent Number: 5,023,717

[45] Date of Patent: Jun. 11, 1991

[54] TELEVISION STANDARD CONVERSION ARRANGEMENT WHICH CONVERTS DIRECTLY TO A SECOND STANDARD FROM A FIRST STANDARD WITHOUT AN INTERMEDIARY CONVERSION

[75] Inventors: Moustanir Lamnabhi, Limeil Brevannes; Jean-Jacques Lhuillier, Saint Maur, both of France

[73] Assignee: U.S. Philips Corporation, New York, N.Y.

[21] Appl. No.: 404,935

[22] Filed: Sep. 7, 1989

[30] Foreign Application Priority Data

Sep. 9, 1988 [FR] France .............................. 88 11797

[51] Int. Cl.$^5$ ............................................ H04N 7/01
[52] U.S. Cl. .................................... 358/140; 358/105
[58] Field of Search ................ 358/105, 140, 136, 138

[56] References Cited

U.S. PATENT DOCUMENTS

| | | | |
|---|---|---|---|
| 4,731,648 | 3/1988 | Bernard et al. | 358/140 |
| 4,845,557 | 7/1989 | Lang | 358/105 |
| 4,862,239 | 8/1989 | Gillard et al. | |
| 4,862,260 | 8/1989 | Harradine et al. | |
| 4,862,266 | 8/1989 | Gillard | |
| 4,862,267 | 8/1989 | Gillard et al. | |
| 4,864,393 | 9/1989 | Harradine et al. | |
| 4,864,394 | 9/1989 | Gillard | |
| 4,864,398 | 9/1989 | Avis et al. | |
| 4,901,145 | 2/1990 | Harradine et al. | |

FOREIGN PATENT DOCUMENTS 0294962 9/1989 European Pat. Off. .
2162018 1/1986 United Kingdom .

OTHER PUBLICATIONS

ICC '86–Integrating the World Through Communications, Toronto, 22-25 Jun., 1986, vol. 2/3, pp. 1280-1284, IEEE, Ninomiya et al., "A Motion Vector Detector ... ".
Signal Processing of HDTV, l'Aquila, 29 fevrier—2 Mar. 1988, pp. 449-458, Ernst et al., "Adaptive Filtering for Improved Standards Conversion".
Fernseh & Kino Technik, vol. 42, No. 4, Apr. 1988, pp. 177-178, 180-184, G. Holoch, "Aspekte der Normwandlung von HDTV in bestehende Fernsehstandards".
Signal Processing, vol. 11, No. 4 Dec. 1986, pp. 387-404, Elsevier Science, M. Bierling et al, "Motion Compensating Field Interpolation Using a ... ".

Primary Examiner—Victor R. Kostak
Attorney, Agent, or Firm—Edward W. Goodman

[57] ABSTRACT

This arrangement has an input terminal (1, 2 and 3) for receiving pictures in accordance with a first standard, an output terminal (5, 6 and 7) for supplying pictures in accordance with a second standard, motion-compensated interpolation members (10 and 13) disposed between the input terminal and the output terminal and a motion-estimating member (12) for applying motion indications to the interpolation member. The interpolation member is designed for processing each pixel of the picture of the second standard directly from the pictures of the first standard while taking account of the motion indication assigned to each one of the pixels of the picture of the second standard.

2 Claims, 8 Drawing Sheets

TELEVISION STANDARD CONVERSION ARRANGEMENT WHICH CONVERTS DIRECTLY TO A SECOND STANDARD FROM A FIRST STANDARD WITHOUT AN INTERMEDIARY CONVERSION

BACKGROUND OF THE INVENTION

1. Field of The Invention

The present invention relates to a television standard conversion arrangement, the arrangement having an input terminal for receiving pictures of a first standard, an output terminal for supplying pictures of a second standard, at least one motion-compensated interpolation member provided between the input and the output terminal and a motion-estimating member for applying motion indications to said interpolation member.

2. Description of the Related Art

Arrangements of this type are well known and are described in, for example, European Patent Application No. EP-A 0187641.

In order to effect the conversion of the standards, a number of difficulties are encountered. In the first place, the picture rate as well as the number of lines may be different; furthermore, interlaced or non-interlaced pictures may be involved.

In the European Patent Application mentioned above, the interpolation is only effected on non-interlaced pictures which renders it necessary, when the first standard relates to interlaced pictures, to provide a conversion in order to obtain sequential pictures, that is to say non-interlaced pictures. This conversion is effected by taking only the presence of overall motion into account.

Consequently, the prior-art arrangement may supply pictures of the second standard which do not always have an adequate quality.

SUMMARY OF THE INVENTION

The invention has for its object to provide an arrangement of this type which provides converted pictures of a better quality, without the need for previous conversion when the first standard operates with interlaced pictures.

To that end, the arrangement is characterized in that at least one of the interpolation members is designed to process each pixel of the pictures of the second standard directly on the basis of the pictures of the first standard while taking into account the motion indication supplied by the motion estimation member which is provided for assigning a motion indication to each one of the pixels of the picture of the second standard.

In accordance with an important characteristic of the invention, the standard conversion arrangement according to the invention furthermore includes a definition-reducing member connected to the input terminal for applying picture information to the motion estimation member.

This characteristic provides the advantage that the calculations for determining the motion indication are effected on pictures which have less pixels and consequently become significantly less important without any detriment to the quality of the converted pictures.

BRIEF DESCRIPTION OF THE DRAWINGS

The following description which is given by way of non-limitative example, with reference to the accompanying drawings, will make it better understood how the invention can be put into effect.

DESCRIPTION OF THE PREFERRED EMBODIMENT

Figure 1:
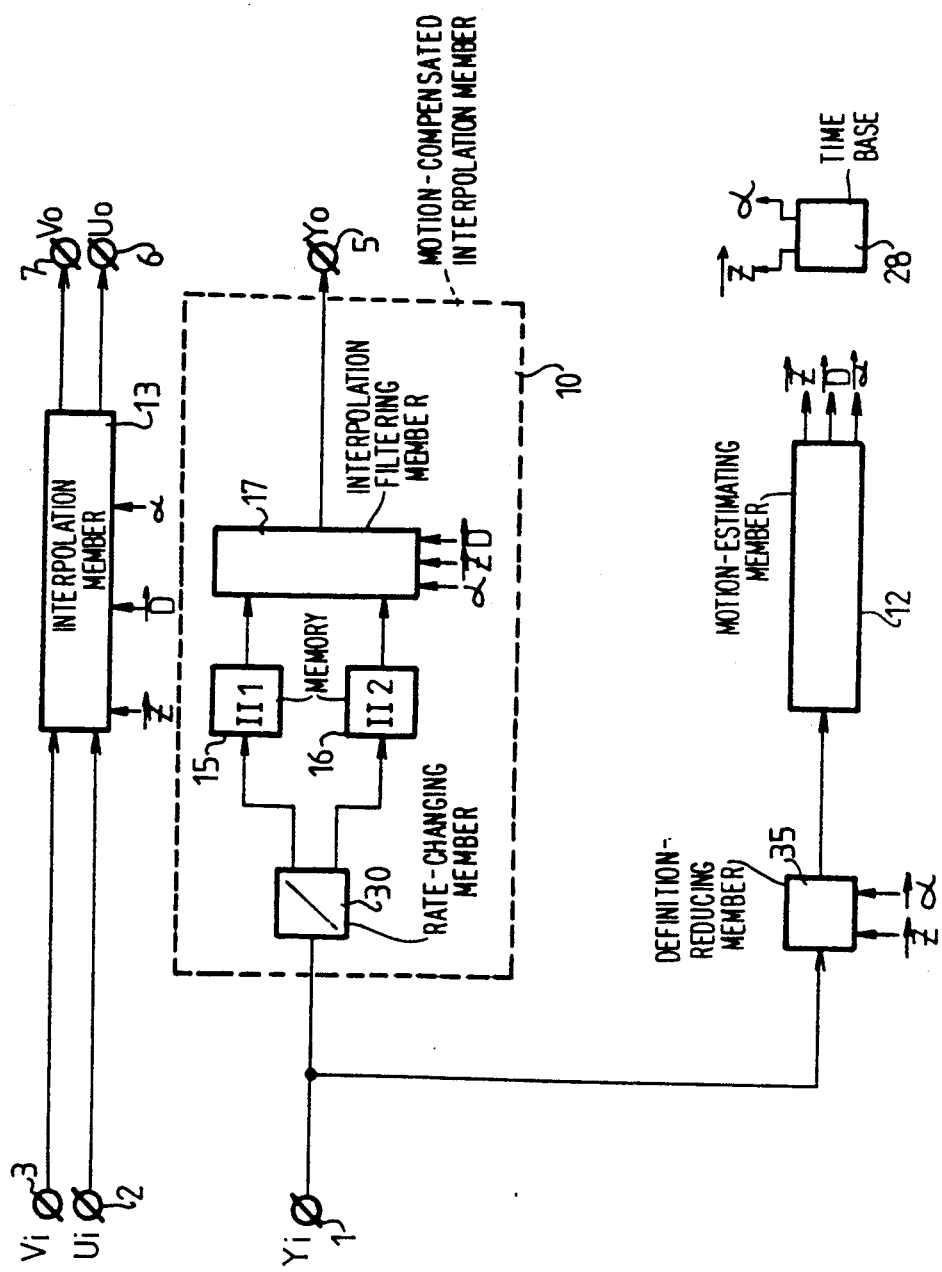
FIG. 1 is a circuit diagram of a standard conversion arrangement according to the invention.

FIG. 1 is a block circuit diagram of a standard conversion according to the invention. The luminance signals Yi and the color difference signals Ui and Vi, which occur in conformity with the requirements of a first television standard, are applied to the respective input terminals 1, 2 and 3; which first standard implies a first picture rate, a first number of lines per picture and an interlace format. Interlace format must here to be understood to indicate the possibility of having interlaced or non-interlaced pictures. The luminance signals Yo and the color difference signals Uo and Vo are made available at the output terminals 5, 6 and 7 in conformity with a second television standard, that is to say a standard having a second picture rate, a second number of lines and a second interlace format. A motion-compensated interpolation member 10 supplies the signals Yo, taking a motion vector $\overline{D}$ constituting said motion indication, into account. This vector $\overline{D}$ is determined by the motion-estimating member 12. The color difference signals are also interpolated by an interpolation member 13 appropriate for these signals, which will be described in detail hereinafter.

In accordance with the invention, this interpolation is effected directly on the basis of the pixel to be supplied for the second standard from the pictures of the first standard stored in buffer stores 15 and 16 which form part of the member 10; the memory 15 contains the pixels belonging to a first picture II1 of the first standard and the memory 16 contains the pixels of the subsequent picture II2, while the motion-estimating member 12 supplies vectors $\overline{D}$ established for each one of the pixels of the second standard.

Figure 2:
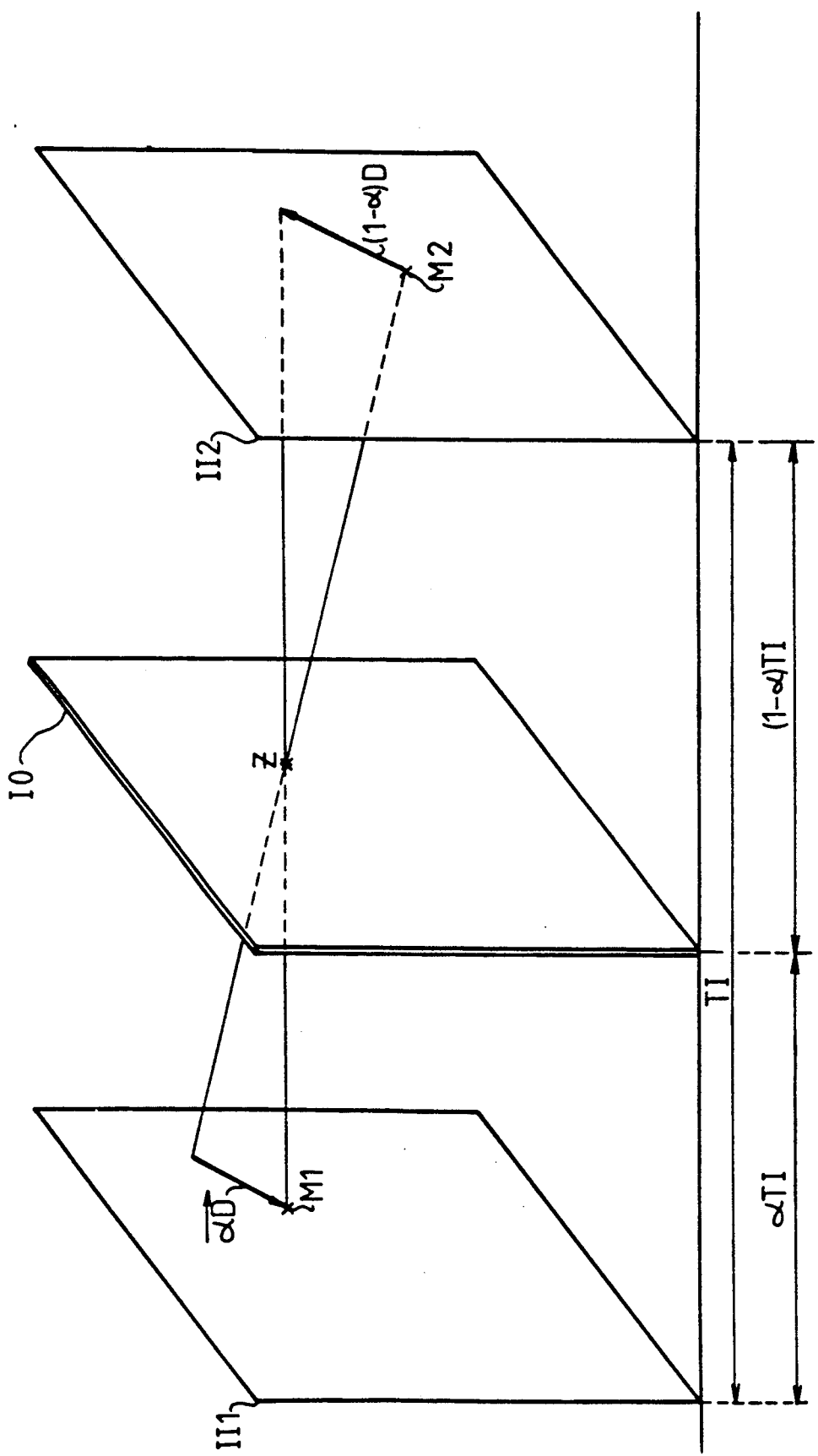
FIG. 2 is a circuit diagram used to explain the image interpolation versus time.
Figure 3A:
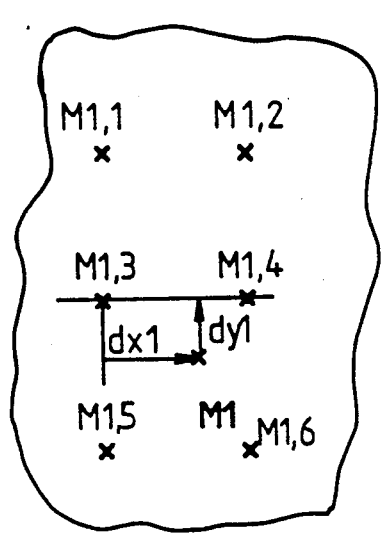
FIGS. 3a and 3b show the configuration of the pixels surrounding a picture element to be interpolated.
Figure 3B:
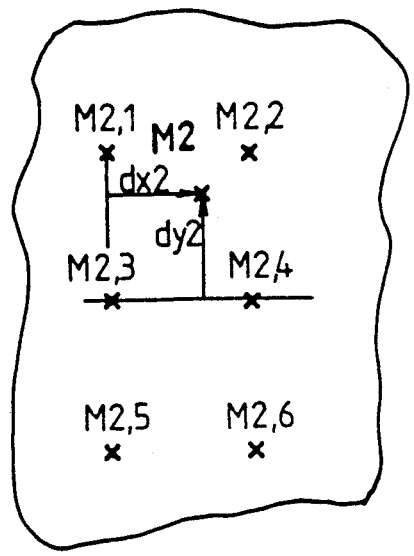

In the sequel of this description, a vector $\overline{Z}$ will appear which represents the coordinates of a point over the different pictures. Thus, for a point $\overline{Z}$ which corresponds to a pixel of the picture I0 of the second standard, there will be in the pictures I1 and I2, the corresponding points M1 and M2 having the coordinates:

$$\overline{Z} - \alpha \overline{D}$$

$$\overline{Z} + (1-\alpha)\overline{D}$$

wherein $\alpha$ determines the temporal position of the picture I0 to be interpolated. This is shown in FIG. 2. The value $\alpha$ less than 1 lays down the location of this picture I0 with respect to the picture I1 and I2 separated by a time interval equal to TI. The picture I0 is placed at the time $\alpha$TI after the picture I1 and at a time $(1-\alpha \text{TI})$ before the picture I2. The points M1 and M2 do not necessarily correspond to the pixels in these pictures I1 and I2. Thus, an interpolation filtering member 17 will assign a luminance value Yo(Z) to the point $\overline{Z}$ on the basis of the pixels belonging to the pictures I1 and I2. In this respect, reference is made to the FIGS. 3a and b*b* relating to the points M1 and M2, respectively. This luminance is established from the pixels surrounding the points M1 and M2. The pixels surrounding the point M1 are denoted by M1,1 M1,2 M1,3 M1,4 M1,5 and M1,6 and their respective luminances by Y(M1,1) and Y(M1,2) Y(M1,3) Y(M1,4) Y(M1,5) and Y(M1,6). In a similar manner, the pixels surrounding the point M2 are given the references M2,1 M2,2 M2,3 M2,4 M2,5 M2,6, their associated luminance the references Y(M2,1) Y(M2,2) Y(M2,3) Y(M2,4) Y(M2,5) and Y(M2,6). The distances dy1 and dy2 are defined relative to the horizontal formed by the points M1,3 and M1,4 as regards the image I1 and the points M2,3 and M2,4 as regards the image I2. The values dy1 and dy2 may either be positive or negative depending on whether M1 or M2 are located above or below said horizontal lines. The distance dx1 and dx2, assumed to be positive, are defined relative to the verticals passing through M1,1 M1,3 and M1,5 and through M2,1 M2,3 and M2,5, respectively.

All the distances dx1, dx2, dy1 and dy2 represent a fraction of the horizontal and vertical distances separating the pixels and their absolute value is less than or equal to "1".

Figure 4:
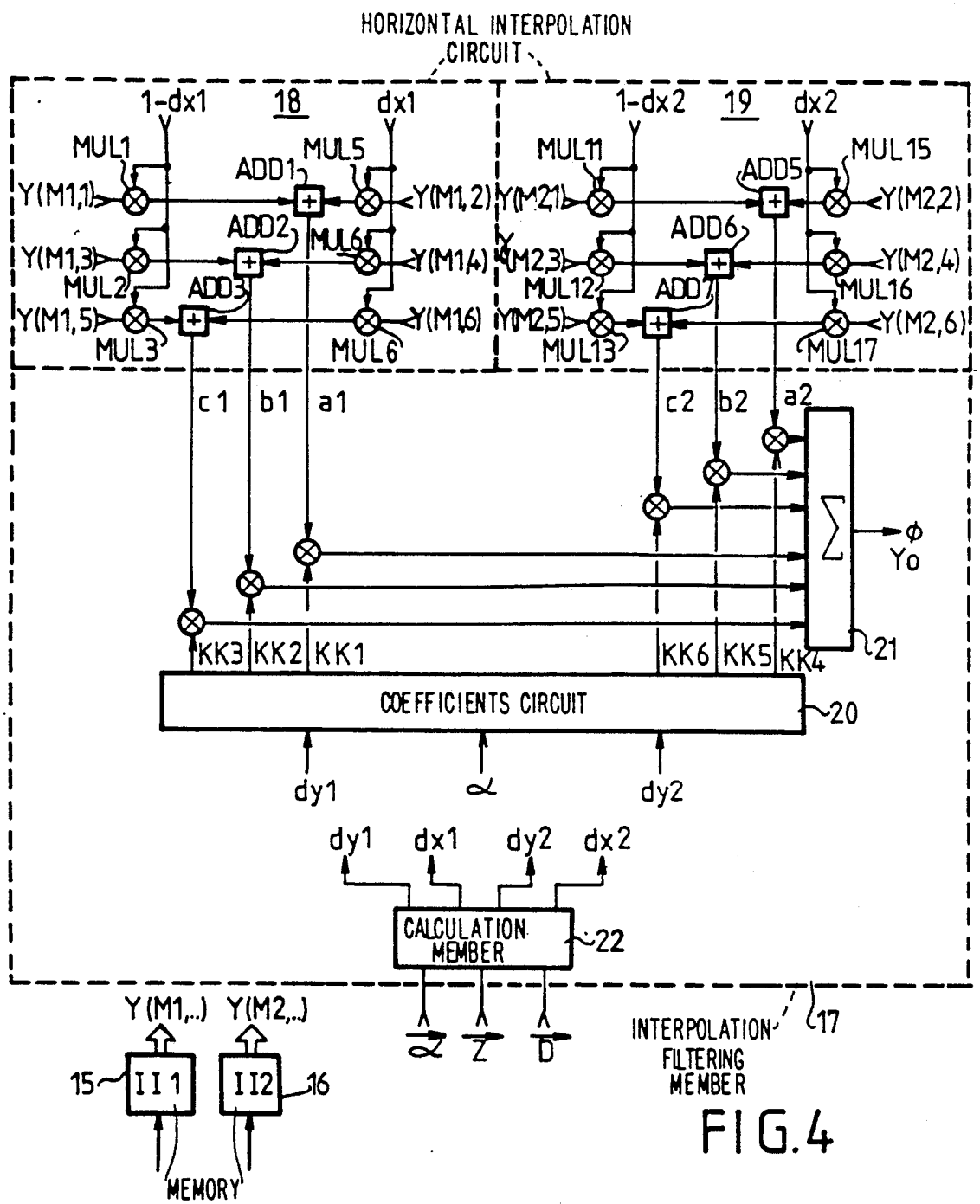
FIG. 4 shows in detail an interpolation filtering member which is part of the arrangement according to the invention.

To effect these interpolations, the interpolation filtering member 17, which is shown in detail in FIG. 4, comprises in first place two horizontal interpolation circuits 18 and 19. The circuit 18 supplies the luminance signals a1, b1 and c1 from the signals Y(M1,1) to Y(M1,6) coming from the memory 15. The signals are such that:

$$a1 = (1-dx1) \cdot y(M1,1) + dx1 \cdot y(M1,2)$$

$$b1 = (1-dx1) \cdot y(M1,3) + dx1 \cdot y(M1,4)$$

$$c1 = (1-dx1) \cdot y(M1,5) + dx1 \cdot y(M1,6)$$

This is provided by the multipliers MUL1, MUL2 and MUL3 which multiply the signals Y(M1,1) Y(M1,3) and Y(M1,5) by 1−dx1, by the multipliers MUL5, MUL6 and MUL7 which multiply the signals Y(M1,2) Y(M1,4) and Y(M1,6) by dx1, and by the adders ADD1, ADD2 and ADD3 which add the results of the multipliers. The horizontal interpolation circuit 19 provides the luminance signals a2, b2 and c2 on the basis of the signals Y(M2,1) to Y(M2,6) coming from the memory 16 in accordance with the formula:

$$a2 = (1-dx2) \cdot y(M2,1) + dx2 \cdot y(M2,2)$$

$$b2 = (1-dx2) \cdot y(M2,3) + dx2 \cdot y(M2,4)$$

$$c2 = (1-dx2) \cdot y(M2,5) + dx2 \cdot y(M2,6)$$

This is provided by the multipliers MUL11, MUL12, and MUL13 which multiply the signals Y(M2,1) Y(M2,3) and Y(M2,5) by 1−dx2, by the multipliers MUL15, MUL16 and MUL17 which multiply the signals Y(M2,2) Y(M2,4) and Y(M2,6) by dx2 and by the adders ADD5, ADD6 and ADD7 which add together the results of the multipliers MUL11 and MUL15, MUL12 and MUL16, MUL13 and MUL17 so as to produce the signals a2, b2 and c2. A coefficients circuit 20 produces different coefficients KK1 to KK6 and cooperate with an adder circuit 21 for producing the signal Yo such that:

$$Yo = KK1 \cdot a1 + KK2 \cdot b1 + KK3 \cdot c1 + KK4 \cdot a2 + KK5 \cdot b2 + KK6 \cdot c2 \qquad (1)$$

Figure 5:
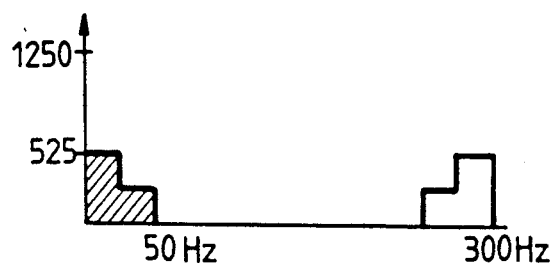
FIG. 5 shows the filtering profile provided by the member of FIG. 4.

The coefficients KK1 to KK6 depend on the quantities dy1, $\alpha$, dy5. These coefficients must gaurantee a filtering profile as shown in FIG. 5, that is to say a filter which transmits more specifically the vertical details whose definition is less at a frequency corresponding to 525 lines and temporal details less than 50 Hz.

A calculation member 22 processes the different quantities dy1, dx1, dy2 and dx2 which are useful for the interpolation from $\alpha$, $\overline{Z}$ and $\overline{D}$.

The above formula (1) actually represents a double interpolation:

a vertico-temporal interpolation in which the luminances Y(M1) and y(M2) of the elements M1 and M2 are functions f1 and f2 of the following parameters:

$$Y(M1) = f1(a1,b1,c1,a2,b2,c2,dy1)$$

$$Y(M2) = f2(a1,b1,c1,a2,b2,c2,dy2)$$

a temporal interpolation as a function of $\alpha$:

$$Yo = (1-\alpha) \cdot Y(M1) + \alpha Y(M2)$$

that is to say a function g implying the following parameters:

$$Yo = g(a1,b1,c1,a2,b2c2,dy1,dy2,\alpha)$$

These interpolation ideas are stated in the article: "Adaptive filtering for improved standard conversion" published in: 2nd INTERNATIONAL WORKSHOP ON SIGNAL PROCESSING OF HDTV, L'AQUILA-ITALY (Feb. 29 –Mar.2, 1988).

The quantity $\overline{D}$ is processed by the motion-estimating member 12. This member also produces the values $\overline{Z}$ and $\alpha$ connected with $\overline{D}$. A time base 28 (FIG. 1) forces the motion-estimating member 12 to process the points M which correspond to the pixels of the pictures of the second standard.

A rate-changing member 30 applies the picture information components to the buffer memories 15 and 16 at the rate of the pictures of the second standard, so that the interpolation is effected systematically with the information components contained in these buffer memories 15 and 16.

To avoid too many calculations, the invention proposes to effect the movement estimations on pictures of a reduced definition and a reduced format. A definition-reducing member 35 is arranged between the input terminal 1 and the motion-estimating member 12.

Figure 6:
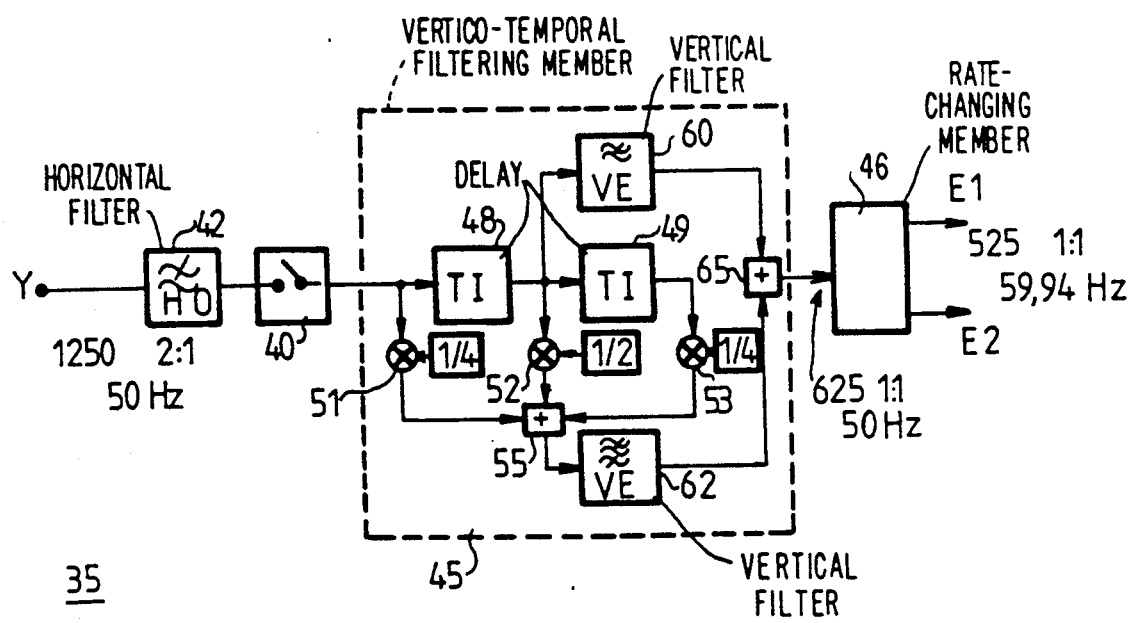
FIG. 6 is the circuit diagram of a first definition-reducing member suitable for the invention.

In FIG. 6 a definition-reducing member 35 is shown which is suitable for a standard conversion device intended to convert a 1250 line standard relating to interlaced imaged at the rate of 50 pictures per second into a second 525 line standard relating to non-interlaced pictures but this time at the rate of 59.94 pictures per second. This member 35 is first of all constituted by a horizontal decimation member 40 which takes one picture element out of two of the pictures of the first standard, which is effected after filtering performed by a horizontal filter 42 so as to avoid spectrum fold-back phenomena. A vertico-temporal filtering member 45 transforms the interlaced pictures into sequential pictures and realizes the change in the number of lines to pass from 1250 lines to 625. A rate-changing member 46 applies two consecutive pictures E1 and E2 to the motion estimation member 12; the pictures E1 and E2 are sequential pictures having 525 lines at the rate of 59.94 pictures per second.

The vertico-temporal filtering member 45 includes first of all two delay elements 48 and 49 which are arranged in cascade and each produce a delay equal to TI. The input of the element 48 is connected to the output of the decimation member 40. Also connected to the output of the member 40 is the input of a multiplier 51 which multiplies the luminance samples at the input of the element 48 by a factor of $\frac{1}{4}$; a second multiplier 52 multiplies the samples at the output of the element 48 by a factor of $\frac{1}{2}$; finally a third multiplier 53 multiplies the samples at the output of the element 49 by a factor of $\frac{1}{4}$. An adder 55 adds the different results of these multipliers 51, 52 and 53. The input of a vertical low-pass filter 60 is connected to the output of the element 48. This filter is said to be vertical as it has for its object to process the lines of picture elements. The output of the adder 55 is connected to the input of a further vertical filter 62 which is however of the bandpass type. An adder 65 adds together the output signals of the vertical filters 60 and 61. The output of this adder 65 constitutes the output of the vertico-temporal filtering member 45.

The design of such a definition-reducing member is based on the following considerations as regards the vertico-temporal domain, it being assumed that the number of picture elements per line is identical.

Figure 7:
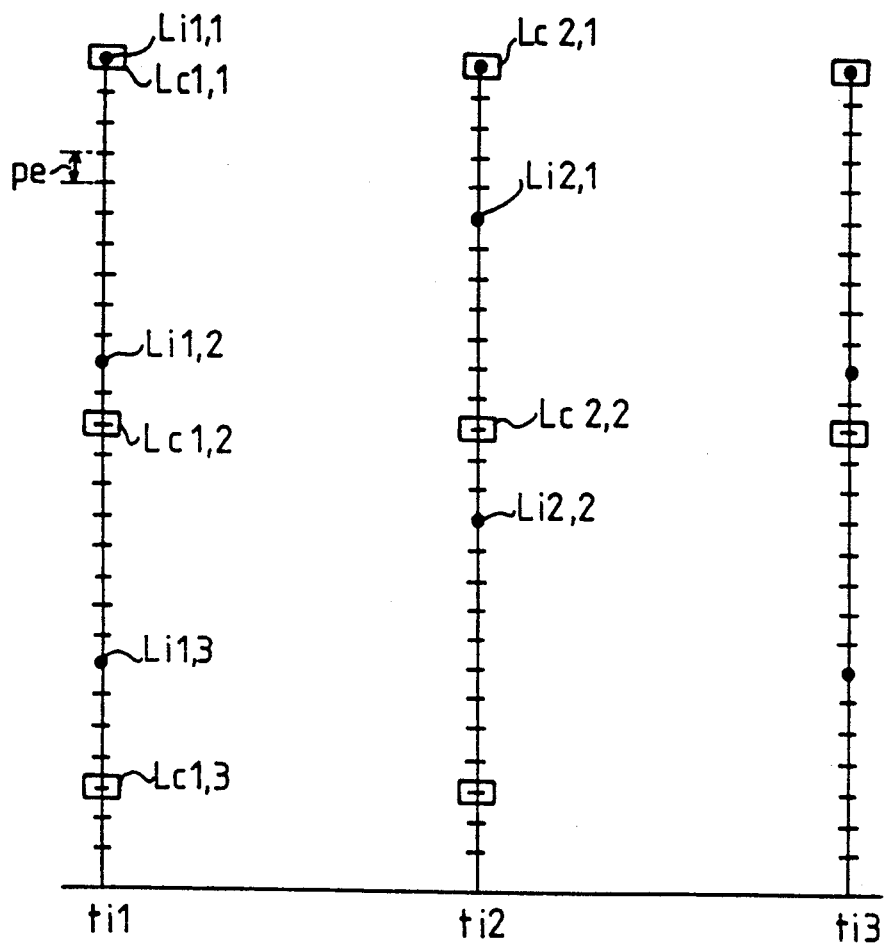
FIG. 7 shows the configuration of the lines to be processed by the definition-reducing member of FIG. 6.

Reference is made to FIG. 7 which shows the appearance of the pictures of the first standard at the instants ti1, ti2, ti3, ... The small black circles denoted Li1,1 Li1,2, Li1,3, ... for the picture occurring at the instant ti1, by Li2,1 ... for the picture at the instant ti2, ..., denote the trace of the lines of the first standard in a plane which is perpendicular thereto. The small white square denoted by Lc1,1 Lc1,2 Lc1,3 ... for the picture at the instant ti1 and by Lc2,1 Lc2,2 of the picture at the instant ti2 represent, in a plane perpendicular to them, the lines to be constructed for the reduced-definition pictures which can be used by the motion-estimating member 12. It should be noted that in this FIG. 7 the lines Li1,1 and Lc1,1 are intermingled and that the distance separating the lines of each picture of the first standard is divided into equal portions "pe" in such a manner that the line Lc1,2 is located at 12 "pe" of the line Li1,1 and the line Lc1,3 is located at 24 "pe". The lines Lci,n of the picture are located at the step "pe", giving the integer EL which is nearest to the division:

$$EL = 10 \cdot [(n-1) \cdot 625]/525$$

Figure 8:
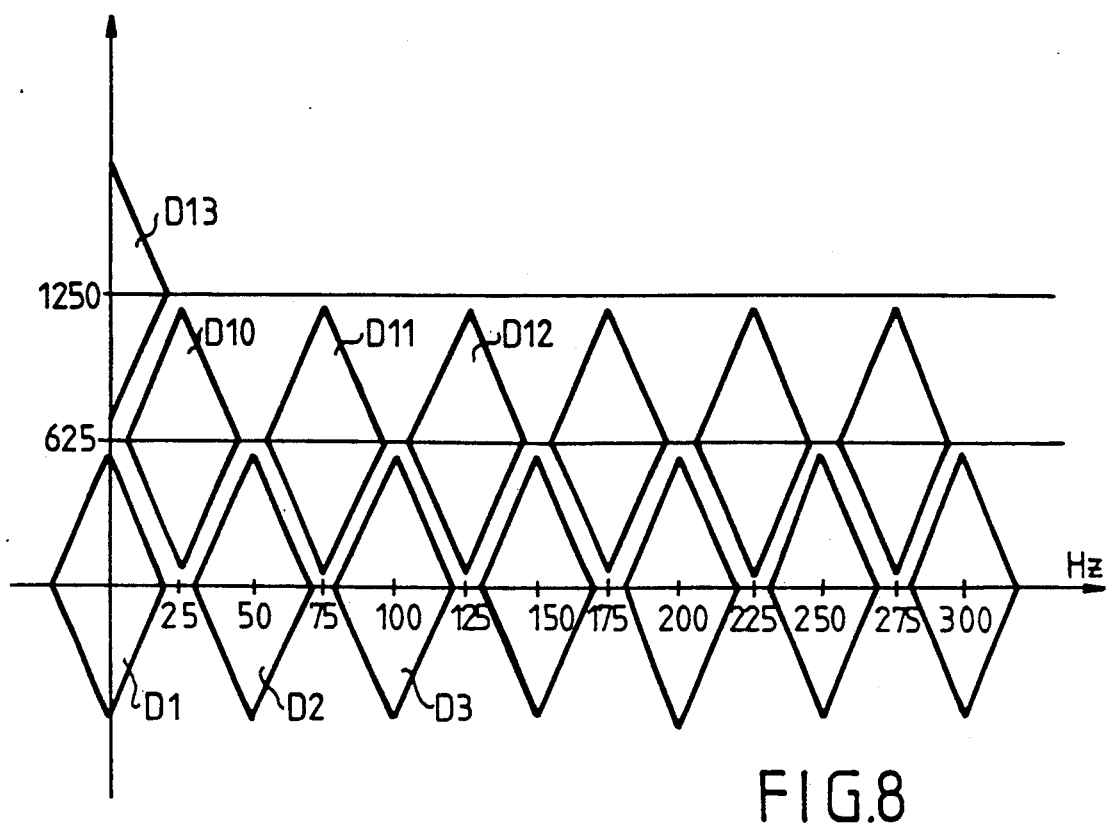
FIG. 8 shows the spectrum in the vertico-temporal domain of the signals of the first standard.

The lines Lci,n are interpolated by means of filters 60 and 62 which prevent the occurrence of spectrum foldback phenomena, taking account of the vertico-temporal spectrum resulting from the interlace of the first standard. The shape of this spectrum is shown in FIG. 8. This spectrum is formed from the interlaced rhombs. A first series of rhombs D1, D2, D3 ... is centered around the horizontal axis in points corresponding to 0 Hz, 50 Hz, 100 Hz. A second series comprising the rhombs D10, D11 ... is centered around the horizontal axis passing through the line frequency corresponding to 625 and to the points 25 Hz, 75 Hz ... A third series of rhombs D20, D21 ... is also shown which is centered around an axis passing through the line frequency corresponding to 1250 and to the points 0 Hz, 50 Hz ... It will be apparent that all these rhombs "pave" the totality of the space shown.

Figure 9:
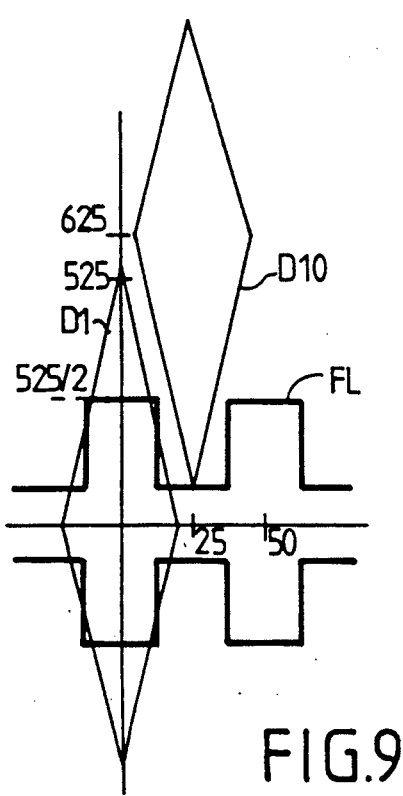
FIG. 9 shows the shape of the filtering profile provided by the definition-reducing member.

FIG. 9 shows the filtering profile produced by the member 45. This filtering must eliminate the detrimental presence of the second series of rhombs D10, D11, D12, ... and must also cut the spectrum portion above (525/2) lines. The characteristic of the filtering operation effected by the filters 60 and 62 is denoted by FL in FIG. 9. This filtering characteristic in the form of crenellations, is the combined result of the actions of the filter members 60 and 62, which cooperate with the action of the temporal filtering operation realized by the elements 48, 49, 51, 52, 53 and 55. The first member 60 effects a low-pass filtering operation and the second member 62 effects a bandpass filtering operations.

Figure 10:
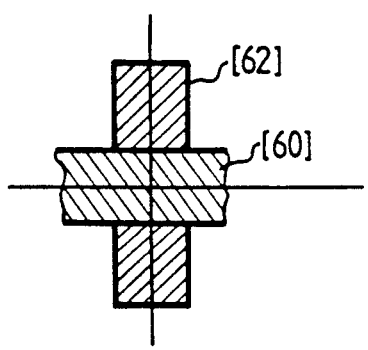
FIG. 10 shows a split into two parts of the structure of FIG. 9.

FIG. 10 has for its objects to illustrate the action of these filters. It will be seen that the filter 60 acts on interlaced pictures, the same pictures as appearing at the input of the member 45 but delayed by a time TI produced by the element 48 while the member 62 operates with sequential pictures obtained at the output of the adder 55.

Figure 11:
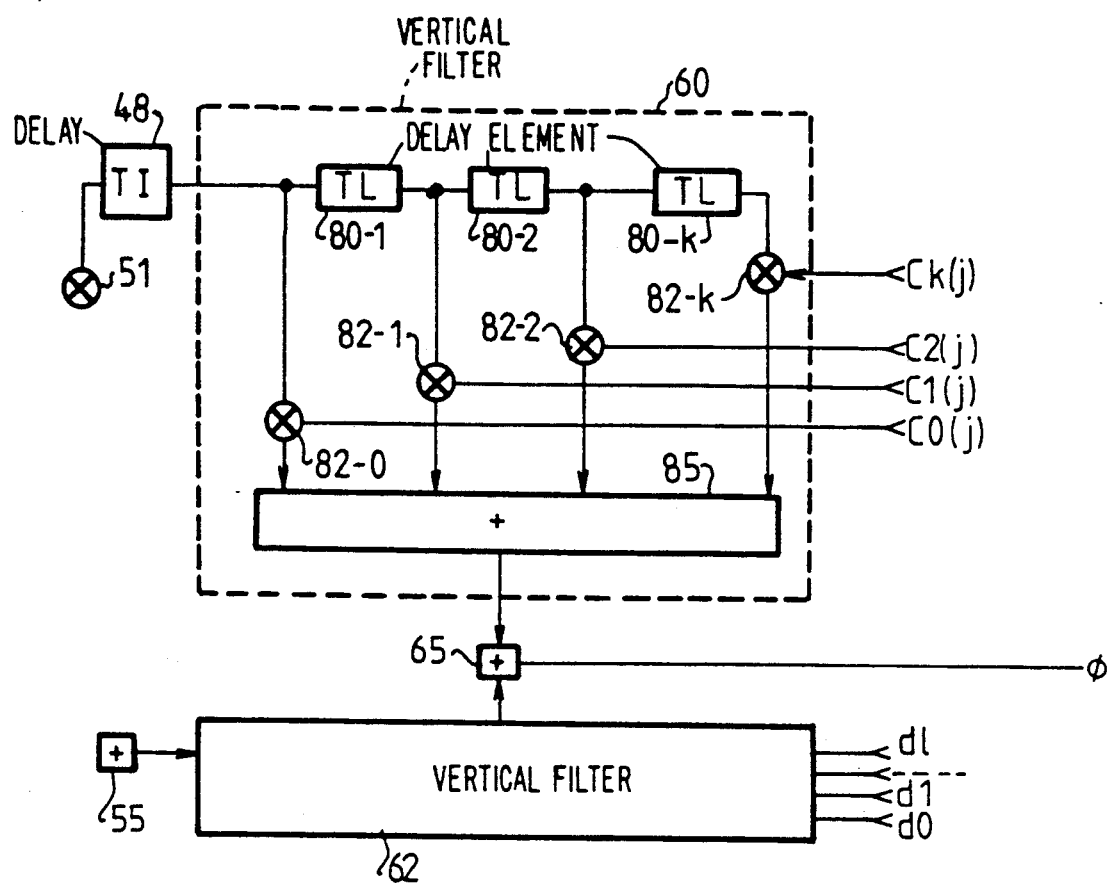
FIG. 11 shows an embodiment of the filtration.

The structure of these filtering members 60 and 62 is the same as in FIG. 11, the only difference being that the structure of the member 60 is shown in greater detail. This member is formed from a cascade arrangement of delay elements 80-1, 80-2, ... 80-k which each produce a delay TL equal to the duration of one line. This cascade arrangement cooperates with the multipliers 82-0, 82-1, 82-2, ... 82-k which multiplies the luminance samples present at the input of the element 80-1 and at the outputs of the elements 80-1 to 80-k by different coefficients c0, c1, c2, ... ck. An adder 85 takes the sum of the results effected by these multipliers. The choice of the coefficients yields the characteristic of the desired filtration. Consequently, the filtering member 62 only differs as regards its structure in the number and the value of its coefficients d0, d1, d2, ... dl in such a manner as to obtain the function of the desired bandpass filtration. The value of these coefficients depends on the value "j" of the line Lci, j to be supplied. However, on account of the interpolation, it is not necessary to consider all the lines at the output of the adder 65 since these lines appear at the same rate as the input lines while a lower number is wanted; consequently, additional non-significant parasitic lines will get mixed in which can easily be eliminated as they are a function of their positions which are known in advance; the member 48 effects this elimination.

Figure 12:
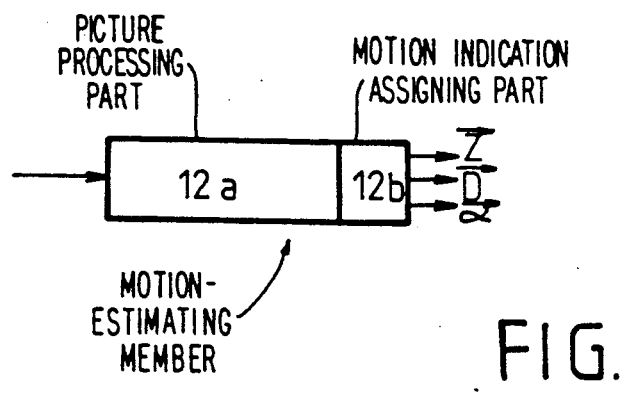
FIG. 12 shows how the motion estimation member is constituted.
Figure 13:
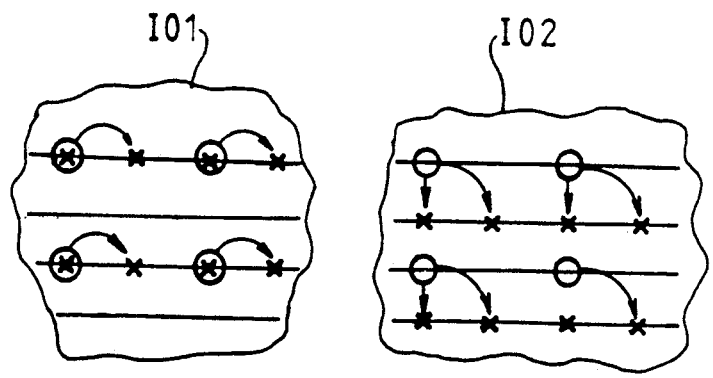
FIG. 13 shows how the movement vectors are assigned.

FIG. 12 shows the motion-estimating member 12. This member is formed from two parts: 12a and 12b. Part 12a has already been described in the French Patent Application No. 8805775 filed by Applicants on Apr. 29, 1988. It should also be noted that that application gives all the indications as regards the structure and the mode of functioning of the rate-changing members 30 and 46 in particular. Since this part 12a processes pictures having a reduced definition, a part 12b is added thereto for assigning the motion indication for all the elements of the second standard, that is to say a vector $\overline{D}$ is given for each element $\overline{Z}$ of the pictures. The manner in which the motion indication is assigned, is shown schematically in FIG. 13. In this figure the circles represent the elements to which a displacement vector is applied, the crosses represent the pixels of the second standard. Since this second standard implies interlaced pictures, it is necessary to distinguish between the two cases of two consecutive pictures I01 and I02. For the picture I01 the points to which a motion indication is assigned correspond to one picture element out of two. The portion 12b will assign the same motion indication to two consecutive pixels. For the picture I02, the points for which there is a motion indication do not correspond to the picture elements of the pictures of this second standard. For the picture element of the output standard, the motion vector of the pixel located thereabove is taken, provided it exists. If it does not exist, the assigned motion is the motion of the picture element preceding in the same line. This is shown by arrows in FIG. 13.

Figure 14:
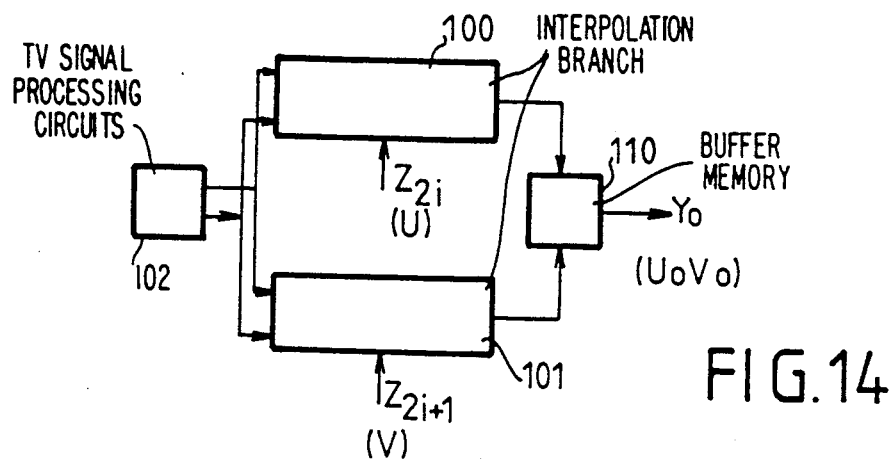
FIG. 14 shows an embodiment of the interpolation members.

A preferred embodiment of the interpolation members 10 and 13 is shown in FIG. 14. These members are formed from two interpolation branches 100 and 101. The branch 100 effects for the interpolation member 10 the interpolations relating to the even pixels Z(2i) of the pictures of the second standard and the branch 101 effects the interpolations relatiing to the odd pixels Z(2i+1). An output buffer memory 110 combines these even and odd picture elements.

The structure of the interpolation member 13 is the same but it should be noted that the branch 100 will effect the interpolation calculations for the color difference signals U while the branch 101 will effect the calculations relative to the color difference signals V. The luminance signal Yi and the color difference signals Ui and Vi are supplied by television signal processing circuits 102.

Figure 15:
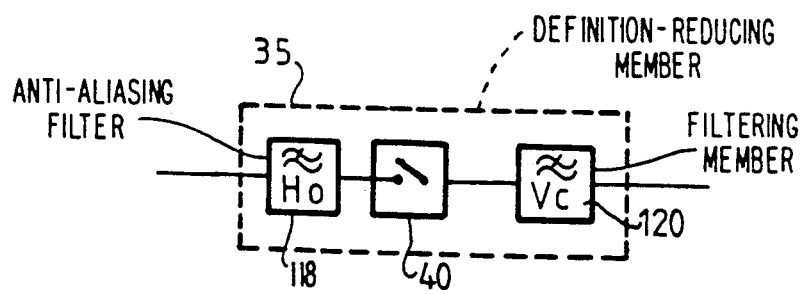
FIG. 15 shows the structure of a definition-reducing member suitable for a first standard if it has a sequential format.

The principles of the present invention also apply when the first standard is a sequential format standard having 1250 lines 1:1 50 Hz. In this case, the definition-reducing member 35 shown in FIG. 15 will only effect a low-pass vertico-temporal filtering operation, exercised by a filtering member 120 which interconnects the decimation member 40 and the output of the definition-reducing member 35. An anti-aliasing filter 118 is included to compensate for the effects of the sampling by the decimation member 40.

Figure 16:
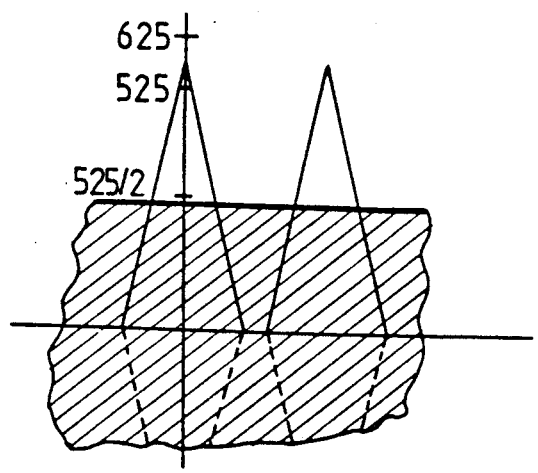
FIG. 16 shows the filtering operation effected by the member of FIG. 15.

Actually, as is shown by FIG. 16 which represents the spectrum of the signals of this first non-interlaced standard, it will be apparent that the second series of rhombs D10, D11 . . . of FIG. 8 no longer exists here.

We claim:

1. A television standard conversion arrangement, comprising:

motion-compensated interpolation means coupled to receive pictures of a first standard for obtaining picture elements of pictures of a second standard directly on the basis of said pictures of said first standard;

motion-estimation means for applying motion indications for each of said picture elements of said second standard to said motion-compensated interpolation means; and definition-reducing means coupled to receive said pictures of said first standard for applying a reduced number of picture elements of said pictures of said first standard to said motion-estimation means, whereby said motion-estimation means only uses said reduced number of pictures elements to obtain said motion indications.

2. A standard conversion arrangement as claimed in claim 1, characterized in that a picture rate-changing member is provided which is located at the input of the definition-reducing means while a second rate-changing member is located at the input of the motion-compensated interpolation means.

* * * * *